May 7, 1929.  H. HASTINGS  1,712,038
METHOD OF MEASURING AND INDICATING THE VOLUME OF LIQUID IN A STORAGE TANK
Filed March 16, 1927
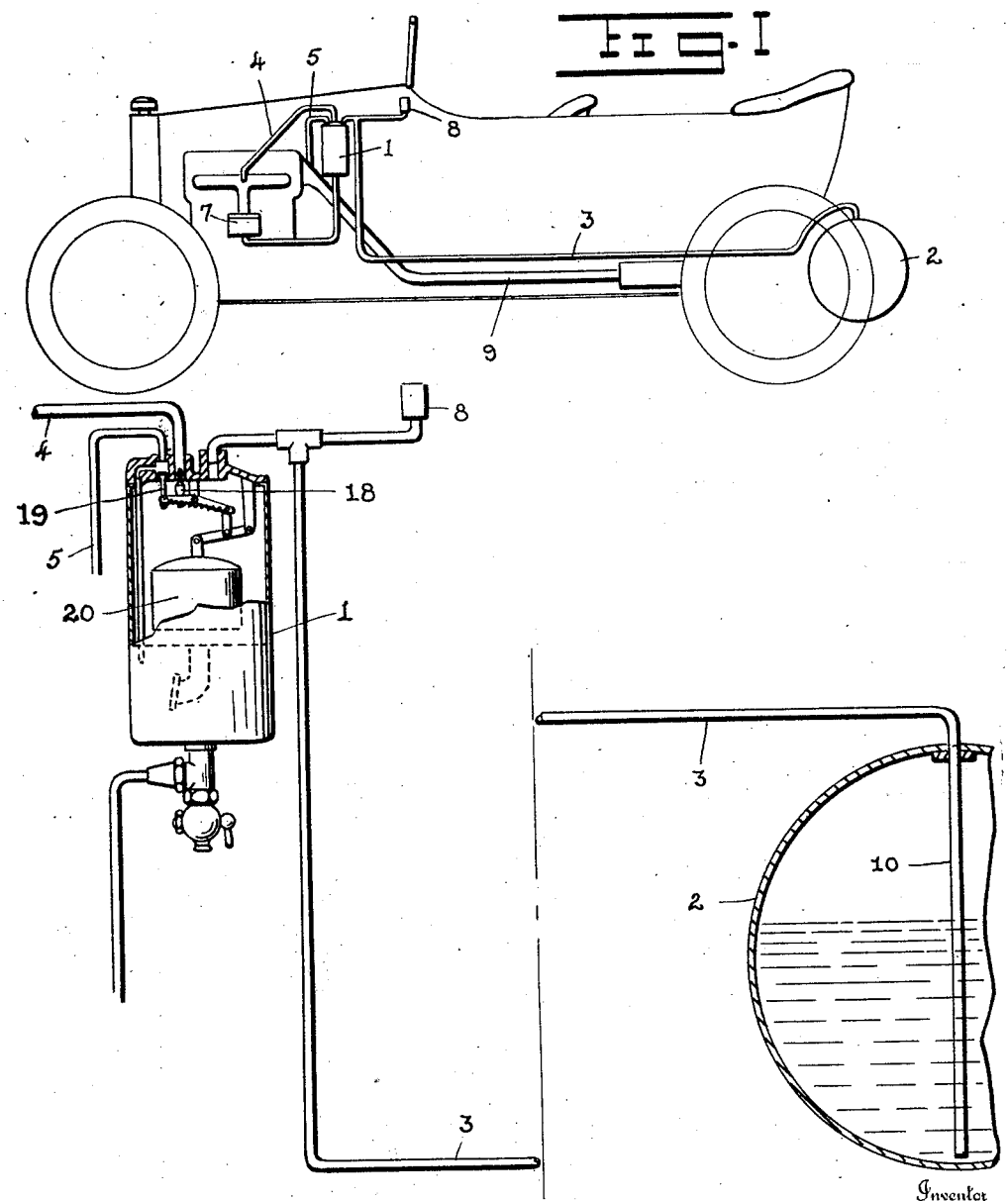
Inventor
Herbert Hastings
By Frank Keipes
Attorney Patented May 7, 1929.

1,712,038

UNITED STATES PATENT OFFICE.

HERBERT HASTINGS, OF ROCHESTER, NEW YORK.

METHOD OF MEASURING AND INDICATING THE VOLUME OF LIQUID IN A STORAGE TANK.

Application filed March 16, 1927. Serial No. 175,674.

My present invention relates to a new method and means for indicating the liquid level in a storage tank especially in a gasoline tank carried by an automobile. The object of this invention is to simplify such an indicating mechanism by making it possible to mount the indicator directly on the fuel feed line at a point remote from the storage tank without interfering with the accuracy of the indication, and without adding a separate indicating line from tank to indicator.

This and other objects of this invention will be fully illustrated in the drawing, described in the specification and pointed out in the claims at the end thereof.

In the accompanying drawing:

Figure 1 is a diagrammatic view of an automobile, its gasoline feed system with the level indicating means applied thereto.

Figure 2 illustrates diagrammatically the method and means of the liquid level indicating mechanism and the associated parts of the liquid feeding mechanism in connection with which the indicating mechanism operates.

The method of indicating the liquid level in storage tanks forming the subject matter of this invention is intended primarily for use in connection with the vacuum method or its equivalent of feeding the liquid from the tank and raising it into an auxiliary tank where the liquid is thereafter automatically released and allowed to flow out by gravity.

In the figures like reference numerals indicate like parts.

In most automobiles the vacuum feed system is used for feeding the gasoline from the storage tank to the carburetor. This system depends on its operation on the mechanism in the so-called vacuum tank which is indicated in the drawing by reference numeral 1. This tank is connected with the storage tank 2 by the feed line 3. A suction line 4 connects the vacuum tank with the intake manifold of the engine or any parts connected therewith in which a partial vacuum is created on the operation of the engine. A third pipe line 5 also leads into the vacuum tank thru which air is admitted into the tank at predetermined intervals in order to destroy the partial vacuum created within the tank and release the liquid fed into the tank by the partial vacuum so that it can flow out by gravity into the bottom of the tank and thence to the carburetor 7.

Within one type of vacuum tank 1 is provided a pair of valves 18 and 19 which control the opening and closing of the vacuum line and the air line respectively. These valves are operated by a float mechanism comprising a float 20 and a series of levers which alternately open and close the air line and vacuum line on the rising and falling of the level of the gasoline within the vacuum tank. There are other methods of controlling the vacuum and air inlets of the vacuum tank besides the method illustrated in Figure 2, but as this mechanism does not form any part of my invention the method illustrated is sufficient for the purpose of describing the level indicating mechanism which operates in connection with a vacuum tank depending on this or any other controlling mechanism for feeding gasoline from the storage tank to a point remote therefrom.

As the vacuum tank does not form any part of this invention no further description of its operating mechanism is given, it being understood that the float mechanism controls the end of the vacuum line 4 which is usually connected to the intake manifold of the engine as illustrated in Figure 1 as well as controls the admission into the tank of air thru the air line 5. When the valve controlling the vacuum line is open the vacuum created within the tank 1 allows atmospheric pressure to force gasoline from the storage tank 2 thru the feed line 3 and into the vacuum tank 1. As soon as the tank 1 is filled the float mechanism operates to close the valve controlling the vacuum line and opens the air line. The admission of air into the tank 1 at once destroys the vacuum in this tank so that the tank will empty itself by gravity into the bottom portion of the tank 1 while any gasoline in the feed line 3 drains back into the storage tank leaving the feed line empty as far as the gasoline level in said tank until gasoline is again drawn from the storage tank into the vacuum tank. However, a new supply is not fed thru the feed line until the vacuum tank has been emptied to a predetermined level at which the float mechanism operates to close the air line and again opens the vacuum line.

To practice my method of indicating the liquid level in the storage tank from which gasoline is fed to the carburetor with the vacuum system described above or a modified form thereof, I connect a pressure indicator 8 to the feed line 3 at any suitable point. Then I connect the air line 5 to a source of low air pressure, as for example the exhaust pipe 9 of the engine. As the pressure of the air to be provided in the air line does not need to be more than enough to completely eject the gasoline from the feed line against the head of gasoline in the storage tank, a strong puff from any source of low pressure such air pressure may also be created by a fan, a pump or even a funnel may be used so that the movement of the vehicle will create sufficient pressure in the air line that may be substituted for the connection with the exhaust pipe in order to perform the function that will now be described.

The intake pipe 10 at the end of the feed line extends to within a short distance of the bottom of the tank and is open at or near the bottom. When, therefore, the vacuum is broken in the vacuum tank 1 and the gasoline in the feed pipe 3 has drained back into the storage tank there remains in this intake pipe a column of liquid equal in height to the depth of the liquid within the tank. However, as soon as the air under low pressure is admitted into the vacuum tank from such sources as are pointed out above, the liquid column in the intake pipe 10 is quickly forced out thru the end of the tube into the storage tank. A certain amount of pressure of the air is required to displace the liquid column and this pressure corresponds to the hydrostatic pressure of the volume of liquid thus displaced. The pressure gauge 8 which is connected with the feed line therefore indicates the hydrostatic pressure of the liquid in the tank as long as air is forced thru the feed line and thus indicates the corresponding liquid level of the tank. A single feed line is thus all that is needed to both feed the gasoline from the storage tank as well as form the connection between the tank 2 and the gauge 8, thru which the liquid level in the storage tank can be determined. Any error which might be introduced through the friction of air through the feed line I eliminate by the use of air at pressure nominally only strong enough to safely overcome the maximum gasoline head in the storage tank.

I claim:

1. In combination with an internal combustion engine, a storage tank and a fuel feed line connecting said storage tank with said internal combustion engine means for intermittently feeding from said storage tank thru said feed line, a pressure indicator connected to said fuel feed line and means for forcing air sufficiently above atmospheric pressure into said fuel feed line to displace the liquid therefrom during the nonfeeding periods to indicate on said pressure indicator the static head of the liquid within the storage tank.

2. In combination with a storage tank, an auxiliary tank and a fuel feed line connecting said storage tank with said auxiliary tank, and opening into the liquid in the storage tank at the minimum depth to be measured, a pressure indicator connected to said fuel feed line, means for alternately creating a pressure below and above atmospheric pressure in said auxiliary tank to alternately feed fuel from the storage tank thru the fuel feed line into the auxiliary tank, and then force the fuel remaining in the fuel feed line back to the storage tank against the static head of the fuel in said storage tank, the static head operating to raise the pressure above atmospheric pressure forced into the fuel feed line and indicate on the pressure indicator in the fuel feed line the pressure of the static head in the storage tank.

In testimony whereof I affix my signature.

HERBERT HASTINGS.